(12) United States Patent
Chen

(10) Patent No.: US 11,696,274 B2
(45) Date of Patent: *Jul. 4, 2023

(54) WIRELESS COMMUNICATIONS METHOD AND DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 149 days.

This patent is subject to a terminal disclaimer.

(21) Appl. No.: 17/235,521

(22) Filed: Apr. 20, 2021

(65) Prior Publication Data

US 2021/0243747 A1 Aug. 5, 2021

Related U.S. Application Data

(63) Continuation of application No. 16/825,929, filed on Mar. 20, 2020, now Pat. No. 11,026,234, which is a (Continued)

(51) Int. Cl.
*H04W 72/044* (2023.01)
*H04B 7/06* (2006.01)
(Continued)

(52) U.S. Cl.
CPC ........ *H04W 72/046* (2013.01); *H04B 7/0617* (2013.01); *H04B 7/0626* (2013.01);
(Continued)

(58) Field of Classification Search
CPC .. H04B 7/0617; H04B 7/0626; H04B 7/0695; H04B 17/373; H04B 7/088; H04L 25/0226; H04L 5/0051
See application file for complete search history.

(56) References Cited

U.S. PATENT DOCUMENTS

| 2015/0334762 | A1 | 11/2015 | Yang et al. |
| 2017/0245230 | A1 | 8/2017 | Islam et al. |
| 2019/0007117 | A1* | 1/2019 | Kim ..................... H04B 7/0617 |

FOREIGN PATENT DOCUMENTS

| CN | 106685496 | 5/2017 |
| CN | 106899378 | 6/2017 |

(Continued)

OTHER PUBLICATIONS

Ericsson, "NR UL power control framework," 3GPP TSG-RAN WG1 NR Ad Hoc #3, R1-1716604, Sep. 2017, 3 pages.
(Continued)

*Primary Examiner* — Zhensheng Zhang
(74) *Attorney, Agent, or Firm* — Hodgson Russ LLP

(57) ABSTRACT

Embodiments of this application provide a wireless communications method and device, to improve communication performance in an aspect of PUCCH transmission. The method includes: determining resource or signal indication information; determining, according to the resource or signal indication information, an uplink or downlink signal quasi co-located with a to-be-transmitted physical uplink control channel PUCCH; and sending the to-be-transmitted PUCCH according to a quasi co-location relationship between the to-be-transmitted PUCCH and the uplink or downlink signal.

15 Claims, 3 Drawing Sheets

Related U.S. Application Data continuation of application No. PCT/CN2017/102800, filed on Sep. 21, 2017.

(51) Int. Cl.
  *H04L 5/00* (2006.01)
  *H04L 25/02* (2006.01)
  *H04W 52/08* (2009.01)
  *H04W 56/00* (2009.01)

(52) U.S. Cl.
  CPC ........ *H04L 5/0051* (2013.01); *H04L 25/0226* (2013.01); *H04W 52/08* (2013.01); *H04W 56/001* (2013.01)

(56) References Cited

FOREIGN PATENT DOCUMENTS

| | | |
|---|---|---|
| CN | 107005362 | 8/2017 |
| JP | 2017085188 | 5/2017 |
| KR | 20160030087 A | 3/2016 |

OTHER PUBLICATIONS

Asustek, "Discussion on UL Beam Management," 3GPP TSG RAN WG1 Meeting NR#3, R1-1716550, Sep. 2017, 5 pages.
NTT DOCOMO, "General Views on QCL Design for NR," 3GPP TSG RAN WG1 Meeting #90, R1-1703926, Aug. 2017, 6 pages.
Qualcomm Incorporated, "Control channel multi-beam operation," 3GPP TSG RAN WG1 #90, R1-1713420, Aug. 2017, 6 pages.
ZTE et al., "Details of UL beam management," 3GPP TSG RAN WG1 Meeting NR#3, R1-1715446, Sep. 2017, 5 pages.
JPO, Office Action for JP Application No. 2020-516469, dated Jul. 30, 2021.
CNIPA, First Office Action for CN Application No. 202010075579.3, dated May 8, 2021.
KIPO, Patent Rejection Decision Document for KR 20207009170, dated Jun. 14, 2022.
Qualcomm Incorporated, "Discussion on QCL", 3GPP TSG RAN WG1 #90, Aug. 21, 2017, R1-1713414.
TWIPO, First Office Action for TW 107133065, dated Apr. 27, 2022.
CNIPA, Third Office Action issued for CN Application No. 202010075579.3, dated Dec. 6, 2021.
KIPO, Notification of Reason for Refusal issued for KR Application No. 10-2020-7009170, dated Dec. 7, 2021.
INAPI, Resolution of Notification of the Expert Report issued for CL Application No. 202000714, Dec. 31, 2021.
Huawei, 3GPP TSG RAN WG1, Meeting NR#3, R1-1715478, "General Considerations on UL Power Control Design", Sep. 2017.
Samsung, "Discussion on beam indication for UL transmission," 3GPP TSG RAN WG1 Meeting #90, R1-1714517, Aug. 2017, 4 pages.
Huawei et al., "General considerations on UL power control design," 3GPP TSG RAN WG1 NR Ad-Hoc Meeting, R1-1709948, Jun. 2017, 6 pages.
Qualcomm Incorporated, "View on DCI contents," 3GPP TSG-RAN WG1#89, R1-1708613, May 2017, 2 pages.
CATT, "NR Power Control Framework," 3GPP TSG RAN WG1 NR Ad Hoc#2, R1-1710043, Jun. 2017, 14 pages.
CNIPA, Second Office Action for CN Application No. 202010075579.3, dated Aug. 23, 2021.
IPI, Office Action for IN Application No. 202017017040, dated Aug. 19, 2021.
Kipris, Office Action for KR Application No. 10-2020-7009170, dated Oct. 11, 2022.
ILPO, Office Action for IL Application No. 273478, dated Oct. 30, 2022.
Samsung, "Discussion on beam indication for UL transmission," 3GPP TSG RAN WG1 NR AH#3, Sep. 18-21, 2017, R1-1715962.

* cited by examiner

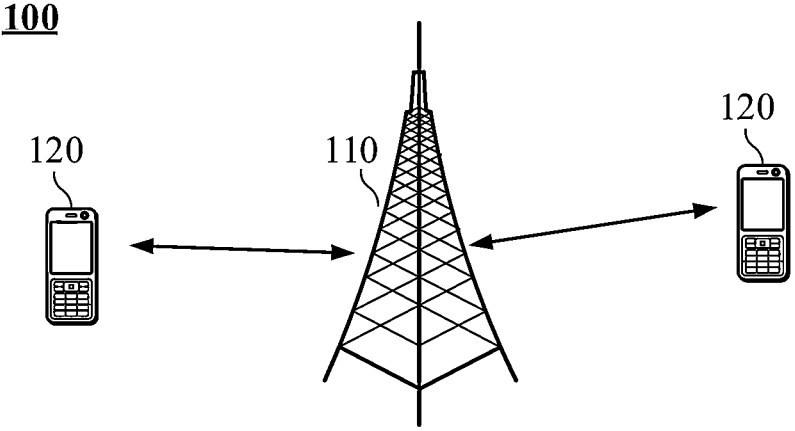

210
A terminal determines resource or signal indication information

220
The terminal determines, according to the resource or signal indication information, an uplink or downlink signal quasi co-located with a to-be-transmitted PUCCH

230
The terminal sends the to-be-transmitted PUCCH according to a quasi co-location relationship between the to-be-transmitted PUCCH and the uplink or downlink signal

FIG. 2

WIRELESS COMMUNICATIONS METHOD AND DEVICE

CROSS-REFERENCE TO RELATED APPLICATIONS

This application is a continuation of U.S. application Ser. No. 16/825,929, filed Mar. 20, 2020, which is a continuation of International Application No. PCT/CN2017/102800, filed Sep. 21, 2017, the entire disclosures of which are incorporated herein by reference.

TECHNICAL FIELD

This application relates to the communications field, and more specifically, to a wireless communications method and device.

RELATED ART

In a Long Term Evolution (Long Term Evolution, LTE) system, a terminal may send a physical uplink control channel (Physical Uplink Control Channel, PUCCH) to a network device. The PUCCH may carry an acknowledgement (Acknowledge, ACK) or a negative acknowledgement (Non-Acknowledge, NACK) for downlink transmission carried on a physical downlink shared channel (Physical Downlink Shared Channel, PDSCH), or carry channel state information (Channel State Information, CSI).

In a new radio (New Radio, NR) system, communication performance is highly required.

Therefore, in the NR system, how to improve communication performance in an aspect of PUCCH transmission is a problem urgently needing to be resolved.

SUMMARY

Embodiments of this application provide a wireless communications method and device, to improve communication performance in an aspect of PUCCH transmission.

According to a first aspect, a wireless communications method is provided. The method includes:

determining resource or signal indication information;

determining, according to the resource or signal indication information, an uplink or downlink signal quasi co-located with a to-be-transmitted physical uplink control channel PUCCH; and sending the to-be-transmitted PUCCH according to a quasi co-location relationship between the to-be-transmitted PUCCH and the uplink or downlink signal.

Therefore, a terminal may obtain, according to a resource or a signal indicated by resource or signal indication information, a first uplink and downlink signal quasi co-located with a to-be-transmitted PUCCH, and send the to-be-transmitted PUCCH according to a quasi co-location relationship between the to-be-transmitted PUCCH and the uplink or downlink signal, to avoid blindly sending the to-be-transmitted PUCCH, and properly send the to-be-transmitted PUCCH, thereby improving communication performance.

With reference to the first aspect, in a possible implementation of the first aspect, that the to-be-transmitted PUCCH is quasi co-located with the uplink or downlink signal includes: the to-be-transmitted PUCCH is quasi co-located with the uplink or downlink signal for a spatial reception parameter.

With reference to either of the first aspect and the foregoing possible implementation, in another possible implementation of the first aspect, the sending the to-be-transmitted PUCCH according to a quasi co-location relationship between the to-be-transmitted PUCCH and the uplink or downlink signal includes:

determining a transmit beam of the to-be-transmitted PUCCH according to the quasi co-location relationship between the to-be-transmitted PUCCH and the uplink or downlink signal; and sending the to-be-transmitted PUCCH by using the determined transmit beam.

Therefore, the terminal may select a transmit beam of the to-be-transmitted PUCCH according to a transmit or receive beam of a signal transmitted on the resource indicated by the resource or signal indication information or according to a transmit or receive beam of the signal indicated by the resource or signal indication information, to select a more suitable transmit beam used for the to-be-transmitted PUCCH to achieve a higher beamforming gain, thereby further improving the communication performance.

With reference to any one of the first aspect or the foregoing possible implementations, in another possible implementation of the first aspect, the determining a transmit beam of the to-be-transmitted PUCCH according to the quasi co-location relationship between the to-be-transmitted PUCCH and the uplink or downlink signal includes:

when a signal quasi co-located with the to-be-transmitted PUCCH is an uplink signal, determining a transmit beam of the uplink signal as the transmit beam of the to-be-transmitted PUCCH; or when a signal quasi co-located with the to-be-transmitted PUCCH is a downlink signal, determining a receive beam of the downlink signal as the transmit beam of the to-be-transmitted PUCCH.

With reference to any one of the first aspect or the foregoing possible implementations, in another possible implementation of the first aspect, the determining, according to the resource or signal indication information, an uplink or downlink signal quasi co-located with a to-be-transmitted PUCCH includes:

determining a signal indicated by the resource or signal indication information, as the uplink or downlink signal quasi co-located with the to-be-transmitted PUCCH; or determining a signal transmitted on a resource indicated by the resource or signal indication information, as the uplink or downlink signal quasi co-located with the to-be-transmitted PUCCH.

With reference to any one of the first aspect or the foregoing possible implementations, in another possible implementation of the first aspect, the resource or signal indication information is sounding reference signal SRS resource indication information, used to indicate one of at least one SRS resource; or the resource or signal indication information is channel state information-reference signal CSI-RS resource indication information, used to indicate one of at least one CSI-RS resource; or the resource or signal indication information is synchronization signal block indication information, used to indicate one of at least one synchronization signal block.

With reference to any one of the first aspect or the foregoing possible implementations, in another possible implementation of the first aspect, the determining resource or signal indication information includes:

determining a type of the resource or signal indication information depending on whether a beam correspondence is available; and determining the resource or signal indication information with the type.

With reference to any one of the first aspect or the foregoing possible implementations, in another possible implementation of the first aspect, the determining a type of the resource or signal indication information depending on whether a beam correspondence of a terminal is available includes:

when the beam correspondence is available, determining that the type of the resource or signal indication information is CSI-RS resource indication information or is synchronization signal block indication information, where the CSI-RS resource indication information is used to indicate one of the at least one CSI-RS resource, and the synchronization signal block indication information is used to indicate one of the at least one synchronization signal block; or when the beam correspondence is unavailable, determining that the type of the resource or signal indication information is SRS resource indication information, where the SRS resource indication information is used to indicate one of the at least one SRS resource.

With reference to any one of the first aspect or the foregoing possible implementations, in another possible implementation of the first aspect, the determining resource or signal indication information includes:

obtaining the resource or signal indication information from downlink control information DCI for scheduling a physical downlink shared channel PDSCH corresponding to the to-be-transmitted PUCCH.

With reference to any one of the first aspect or the foregoing possible implementations, in another possible implementation of the first aspect, the to-be-transmitted PUCCH is used to carry an acknowledgement ACK command or a negative acknowledgement NACK command for downlink transmission, and the PDSCH carries the downlink transmission.

With reference to any one of the first aspect or the foregoing possible implementations, in another possible implementation of the first aspect, the method further includes:

determining, according to the resource or signal indication information, a power adjustment value corresponding to a transmit power control TPC command carried in the DCI and used for the to-be-transmitted PUCCH.

With reference to any one of the first aspect or the foregoing possible implementations, in another possible implementation of the first aspect, the method further includes:

determining, according to the resource or signal indication information, a closed-loop power control process to which the TPC command carried in the DCI and used for the to-be-transmitted PUCCH belongs.

With reference to any one of the first aspect or the foregoing possible implementations, in another possible implementation of the first aspect, the determining resource or signal indication information includes:

obtaining the resource or signal indication information from recently received DCI used to schedule a physical uplink shared channel PUSCH.

With reference to any one of the first aspect or the foregoing possible implementations, in another possible implementation of the first aspect, the determining resource or signal indication information includes:

obtaining the resource or signal indication information from DCI, where the DCI includes only a TPC command used for a PUCCH and resource or signal indication information used to transmit the PUCCH, and the DCI includes the TPC command used for the to-be-transmitted PUCCH and the resource or signal indication information used for the to-be-transmitted PUCCH.

With reference to any one of the first aspect or the foregoing possible implementations, in another possible implementation of the first aspect, the determining resource or signal indication information includes:

obtaining the resource or signal indication information from higher layer signaling.

With reference to any one of the first aspect or the foregoing possible implementations, in another possible implementation of the first aspect, the determining resource or signal indication information includes:

determining the resource or signal indication information according to a power control process used by the to-be-transmitted PUCCH.

With reference to any one of the first aspect or the foregoing possible implementations, in another possible implementation of the first aspect, the determining resource or signal indication information includes:

obtaining the resource or signal indication information from a CSI reporting configuration corresponding to channel state information CSI, where the to-be-transmitted PUCCH is used to transmit the CSI.

With reference to any one of the first aspect or the foregoing possible implementations, in another possible implementation of the first aspect, the to-be-transmitted PUCCH is used to carry the acknowledgement ACK command or the negative acknowledgement NACK command for the downlink transmission.

With reference to any one of the first aspect or the foregoing possible implementations, in another possible implementation of the first aspect, the to-be-transmitted PUCCH is used to carry the channel state information CSI.

With reference to any one of the first aspect or the foregoing possible implementations, in another possible implementation of the first aspect, the determining resource or signal indication information includes:

determining an obtaining manner of the first resource or signal indication information according to a PUCCH format of the to-be-transmitted PUCCH; and obtaining the resource or signal indication information according to the determined obtaining manner.

With reference to any one of the first aspect or the foregoing possible implementations, in another possible implementation of the first aspect, resource or signal obtaining manners used by PUCCHs using different PUCCH formats are different.

According to a second aspect, a wireless communications method is provided. The method includes:

determining resource or signal indication information;

determining a transmit beam of a to-be-transmitted physical uplink control channel PUCCH according to the resource or signal indication information; and sending the to-be-transmitted PUCCH by using the determined transmit beam of the to-be-transmitted PUCCH.

Therefore, a terminal selects a transmit beam of a to-be-transmitted PUCCH according to resource or signal indication information, to select a more suitable transmit beam used for the to-be-transmitted PUCCH, to achieve a higher beamforming gain, thereby further improving communication performance.

With reference to the second aspect, in a possible implementation of the second aspect, the determining a transmit beam of a to-be-transmitted physical uplink control channel PUCCH according to the resource or signal indication information includes:

determining the transmit beam of the to-be-transmitted PUCCH according to a receive or transmit beam of a first signal indicated by the resource or signal indication information; or determining the transmit beam of the to-be-transmitted PUCCH according to a receive or transmit beam of a second signal transmitted on a resource indicated by the resource or signal indication information.

With reference to either of the second aspect and the foregoing possible implementation, in another possible implementation of the second aspect, the determining the transmit beam of the to-be-transmitted PUCCH according to a receive or transmit beam of a first signal indicated by the resource or signal indication information includes:

when the first signal is an uplink signal, determining the transmit beam of the first signal as the transmit beam of the to-be-transmitted PUCCH; or when the first signal is a downlink signal, determining the receive beam of the first signal as the transmit beam of the to-be-transmitted PUCCH.

With reference to any one of the second aspect or the foregoing possible implementations, in another possible implementation of the second aspect, the determining the transmit beam of the to-be-transmitted PUCCH according to a receive or transmit beam of a second signal transmitted on a resource indicated by the resource or signal indication information includes:

when the second signal is an uplink signal, determining the transmit beam of the second signal as the transmit beam of the to-be-transmitted PUCCH; or when the second signal is a downlink signal, determining the receive beam of the second signal as the transmit beam of the to-be-transmitted PUCCH.

With reference to any one of the second aspect or the foregoing possible implementations, in another possible implementation of the second aspect, the resource or signal indication information is sounding reference signal SRS resource indication information, used to indicate one of at least one SRS resource; or the resource or signal indication information is channel state information-reference signal CSI-RS resource indication information, used to indicate one of at least one CSI-RS resource; or the resource or signal indication information is synchronization signal block indication information, used to indicate one of at least one synchronization signal block.

With reference to any one of the second aspect or the foregoing possible implementations, in another possible implementation of the second aspect, the determining resource or signal indication information includes:

determining a type of the resource or signal indication information depending on whether a beam correspondence is available; and determining the resource or signal indication information with the type.

With reference to any one of the second aspect or the foregoing possible implementations, in another possible implementation of the second aspect, the determining a type of the resource or signal indication information depending on whether a beam correspondence is available includes:

when the beam correspondence is available, determining that the type of the resource or signal indication information is CSI-RS resource indication information or is synchronization signal block indication information, where the CSI-RS resource indication information is used to indicate one of the at least one CSI-RS resource, and the synchronization signal block indication information is used to indicate one of the at least one synchronization signal block; or when the beam correspondence is unavailable, determining that the type of the resource or signal indication information is SRS resource indication information, where the SRS resource indication information is used to indicate one of the at least one SRS resource.

With reference to any one of the second aspect or the foregoing possible implementations, in another possible implementation of the second aspect, the determining resource or signal indication information includes:

obtaining the resource or signal indication information from downlink control information DCI for scheduling a PDSCH corresponding to the to-be-transmitted PUCCH.

With reference to any one of the second aspect or the foregoing possible implementations, in another possible implementation of the second aspect, the to-be-transmitted PUCCH is used to carry an acknowledgement ACK command or a negative acknowledgement NACK command for downlink transmission, and the PDSCH carries the downlink transmission.

With reference to any one of the second aspect or the foregoing possible implementations, in another possible implementation of the second aspect, the method further includes:

determining, according to the resource or signal indication information, a power adjustment value corresponding to a transmit power control TPC command carried in the DCI and used for the to-be-transmitted PUCCH.

With reference to any one of the second aspect or the foregoing possible implementations, in another possible implementation of the second aspect, the method further includes:

determining, according to the resource or signal indication information, a closed-loop power control process to which the TPC command carried in the DCI and used for the to-be-transmitted PUCCH belongs.

With reference to any one of the second aspect or the foregoing possible implementations, in another possible implementation of the second aspect, the determining resource or signal indication information includes:

obtaining the resource or signal indication information from recently received DCI used to schedule a physical uplink shared channel PUSCH.

With reference to any one of the second aspect or the foregoing possible implementations, in another possible implementation of the second aspect, the determining resource or signal indication information includes:

obtaining the resource or signal indication information from DCI, where the DCI includes only a TPC command used for a PUCCH and resource or signal indication information used for the PUCCH, and the DCI includes the TPC command used for the to-be-transmitted PUCCH and the resource or signal indication information used for the to-be-transmitted PUCCH.

With reference to any one of the second aspect or the foregoing possible implementations, in another possible implementation of the second aspect, the determining resource or signal indication information includes:

obtaining the resource or signal indication information from higher layer signaling.

With reference to any one of the second aspect or the foregoing possible implementations, in another possible implementation of the second aspect, the determining resource or signal indication information includes:

determining the resource or signal indication information according to a power control process used by the to-be-transmitted PUCCH.

With reference to any one of the second aspect or the foregoing possible implementations, in another possible implementation of the second aspect, the determining resource or signal indication information includes:

obtaining the resource or signal indication information from a CSI reporting configuration corresponding to channel state information CSI, where the to-be-transmitted PUCCH is used to transmit the CSI.

With reference to any one of the second aspect or the foregoing possible implementations, in another possible implementation of the second aspect, the to-be-transmitted PUCCH is used to carry the acknowledgement ACK command or the negative acknowledgement NACK command for the downlink transmission.

With reference to any one of the second aspect or the foregoing possible implementations, in another possible implementation of the second aspect, the to-be-transmitted PUCCH is used to carry the channel state information CSI.

With reference to any one of the second aspect or the foregoing possible implementations, in another possible implementation of the second aspect, the determining resource or signal indication information includes:

determining an obtaining manner of the resource or signal indication information according to a format of the to-be-transmitted PUCCH; and obtaining the resource or signal indication information according to the determined obtaining manner.

With reference to any one of the second aspect or the foregoing possible implementations, in another possible implementation of the second aspect, resource or signal obtaining manners used by PUCCHs using different PUCCH formats are different.

According to a third aspect, a terminal is provided. The terminal is configured to perform the method according to any one of the first aspect or the possible implementations of the first aspect or according to any one of the second aspect or the possible implementations of the second aspect. Specifically, the terminal includes functional modules configured to perform the method according to any one of the first aspect or the possible implementations of the first aspect or according to any one of the second aspect or the possible implementations of the second aspect.

According to a fourth aspect, a terminal is provided. The terminal includes a processor, a memory, and a transceiver. The processor, the memory, and the transceiver communicate with each other through an internal connection path, to transfer a control and/or data signal, so that the terminal performs the method according to any one of the first aspect or the possible implementations of the first aspect or according to any one of the second aspect or the possible implementations of the second aspect.

According to a fifth aspect, a computer-readable medium is provided. The computer-readable medium is configured to store a computer program. The computer program includes an instruction used to perform any one of the foregoing methods or any one of the possible implementation manners.

According to a sixth aspect, a computer program product including an instruction is provided. When the instruction is run on a computer, the computer is enabled to perform the method according to any one of the foregoing methods or any one of the possible implementation manners.

BRIEF DESCRIPTION OF THE DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

FIG. 1 is a schematic diagram of a wireless communications system according to an embodiment of this application;

FIG. 2 is a schematic flowchart of a wireless communications method according to an embodiment of this application;

DETAILED DESCRIPTION

Figure 3:
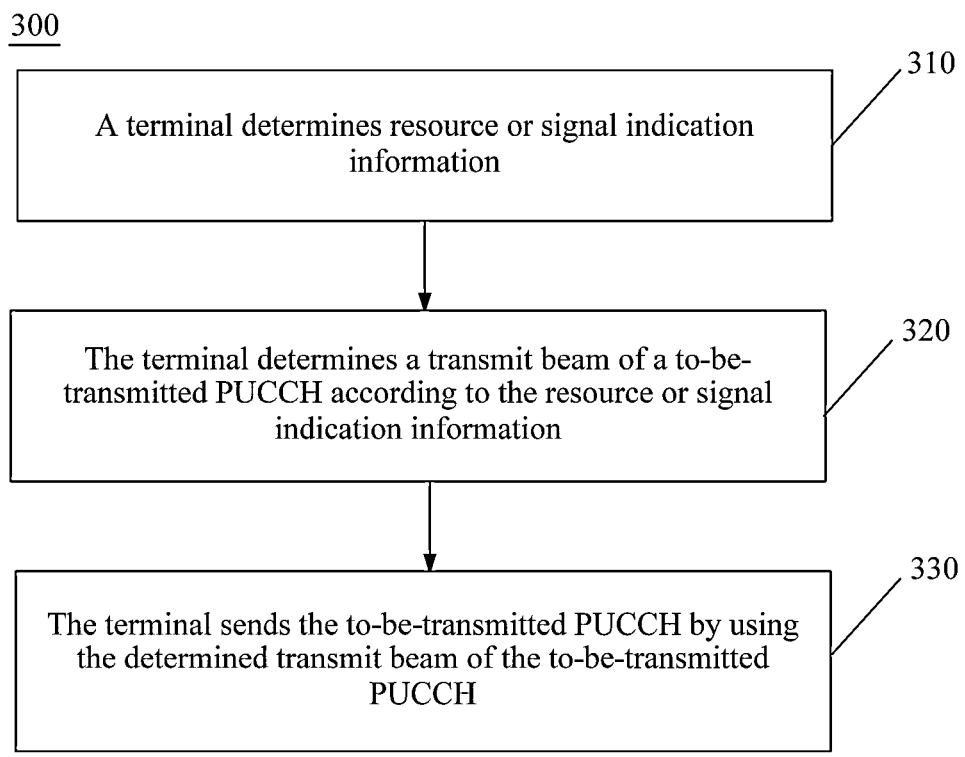
FIG. 3 is a schematic flowchart of a wireless communications method according to an embodiment of this application.

The following describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The technical solutions of the embodiments of this application may be applied to various communications systems, such as: a Global System for Mobile Communications (Global System of Mobile communication, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system, or a 5G system.

FIG. 1 shows a wireless communications system 100 to which an embodiment of this application is applied. The wireless communications system 100 may include a network device 110. The network device 110 may be a device communicating with a terminal device. The network device 110 may provide communication coverage for a particular geographic area, and may communicate with a terminal device (such as UE) located within the coverage. In some embodiments, the network device 110 may be a base transceiver station (Base Transceiver Station, BTS) in a GSM system or a CDMA system, or may be a NodeB (NodeB, NB) in a WCDMA system, or may be an evolved NodeB (Evolutional Node B, eNB or eNodeB) in an LTE system, or a radio controller in a cloud radio access network (Cloud Radio Access Network, CRAN), or the network device may be a reply station, an access point, an in-vehicle device, a wearable device, a network side device in a 5G network, a network device in a future evolved public land mobile network (Public Land Mobile Network, PLMN), or the like.

The wireless communications system 100 further includes at least one terminal device 120 within the coverage of the network device 110. The terminal device 120 may be mobile or fixed. In some embodiments, the terminal device 120 may be an access terminal, user equipment (User Equipment, UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a 5G network, a terminal device in a future evolved PLMN, or the like.

In some embodiments, terminal devices 120 may perform device to device (Device to Device, D2D) communication.

In some embodiments, the 5G system or network may also be referred to as a new radio (New Radio, NR) system or network.

FIG. 1 shows an example of one network device and two terminal devices. In some embodiments, the wireless communications system 100 may include a plurality of network devices, and another quantity of terminal devices may be included within coverage of each network device. This is not limited in this embodiment of this application.

In some embodiments, the wireless communications system 100 may further include another network entity such as a network controller or a mobility management entity. This is not limited in this embodiment of this application.

It should be understood that, the terms "system" and "network" in this specification may be often used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

FIG. 2 is a schematic flowchart of a wireless communications method 200 according to an embodiment of this application. The method 200 may be In some embodiments applied to the system shown in FIG. 1, but is not limited thereto. The method 200 may be In some embodiments performed by a terminal. The method 200 includes at least a part of the following content.

In 210, the terminal determines resource or signal indication information.

In some embodiments, the resource or signal indication information is used to indicate a resource or used to indicate a signal.

In 220, the terminal determines, according to the resource or signal indication information, an uplink or downlink signal quasi co-located with a to-be-transmitted PUCCH.

In some embodiments, that the to-be-transmitted PUCCH is quasi co-located with the uplink or downlink signal includes: the to-be-transmitted PUCCH is quasi co-located with the uplink or downlink signal for a spatial reception parameter.

It should be understood that, if the to-be-transmitted PUCCH is quasi co-located with the uplink or downlink signal for the spatial reception parameter, it indicates that the terminal may assume that a beam used to send the to-be-transmitted PUCCH is in a direction similar to or the same as that of a beam used to send or receive the uplink or downlink signal.

It should be understood that, although in this application, an example in which the quasi co-location is quasi co-location for the spatial reception parameter is mostly used for description, but this embodiment of this application is not limited thereto. For example, the quasi co-location in this embodiment of this application may be quasi co-location for Doppler frequency shift, Doppler spread, delay spread, an average delay, an average gain, or another large-scale parameter.

In some embodiments, when the resource or signal indication information indicates a signal, the terminal determines the signal indicated by the resource or signal indication information, as the uplink or downlink signal quasi co-located with the to-be-transmitted PUCCH.

In some embodiments, the signal of the resource or signal indication information may be a signal sent before the to-be-transmitted PUCCH is sent.

In some embodiments, when the resource or signal indication information indicates a resource, the terminal determines a signal transmitted on the resource indicated by the resource or signal indication information, as the uplink or downlink signal quasi co-located with the to-be-transmitted PUCCH.

In some embodiments, the signal transmitted on the resource indicated by the resource or signal indication information may be a signal sent before the to-be-transmitted PUCCH is sent.

In 230, the terminal sends the to-be-transmitted PUCCH according to a quasi co-location relationship between the to-be-transmitted PUCCH and the uplink or downlink signal.

In some embodiments, the terminal determines the transmit beam of the to-be-transmitted PUCCH according to the quasi co-location relationship between the to-be-transmitted PUCCH and the uplink or downlink signal; and sends the to-be-transmitted PUCCH by using the determined transmit beam.

Specifically, the terminal may determine the transmit beam of the to-be-transmitted PUCCH according to a quasi co-location relationship for a spatial parameter between the to-be-transmitted PUCCH and the uplink or downlink signal.

In a manner, when a signal quasi co-located with the to-be-transmitted PUCCH is an uplink signal, a transmit beam of the uplink signal is determined as the transmit beam of the to-be-transmitted PUCCH, or a transmit beam in a direction similar to that of a transmit beam of the uplink signal may be determined as the transmit beam of the to-be-transmitted PUCCH.

In another manner, when a signal quasi co-located with the to-be-transmitted PUCCH is a downlink signal, a receive beam of the downlink signal is determined as the transmit beam of the to-be-transmitted PUCCH, or a receive beam in a direction similar to that of a receive beam of the downlink signal may be determined as the transmit beam of the to-be-transmitted PUCCH.

In some embodiments, because optimal beams used by the terminal to send a PUCCH at different moments may be different, the terminal may obtain the resource or signal indication information in real time.

Therefore, in this embodiment of this application, the terminal may obtain, according to a resource or a signal indicated by resource or signal indication information, a first uplink and downlink signal quasi co-located with a to-be-transmitted PUCCH, and send the to-be-transmitted PUCCH according to a quasi co-location relationship between the to-be-transmitted PUCCH and the uplink or downlink signal, to avoid blindly sending the to-be-transmitted PUCCH, and properly send the to-be-transmitted PUCCH, thereby improving communication performance.

Further, the terminal may select a transmit beam of the to-be-transmitted PUCCH according to a transmit or receive beam of a signal transmitted on the resource indicated by the resource or signal indication information or according to a transmit or receive beam of the signal indicated by the resource or signal indication information, to select a more suitable transmit beam used for the to-be-transmitted PUCCH to achieve a higher beamforming gain, thereby further improving the communication performance.

FIG. 3 is a schematic flowchart of a wireless communications method 300 according to an embodiment of this application. The method 300 includes at least a part of the following content.

In 310, a terminal determines resource or signal indication information.

In some embodiments, the resource or signal indication information is used to indicate a resource or used to indicate a signal.

In 320, the terminal determines a transmit beam of a to-be-transmitted PUCCH according to the resource or signal indication information.

In some embodiments, the terminal determines the transmit beam of the to-be-transmitted PUCCH according to a receive or transmit beam of a first signal indicated by the resource or signal indication information.

In some embodiments, the first signal indicated by the resource or signal indication information may be a signal sent before the PUCCH is sent.

In some embodiments, when the first signal is an uplink signal, the terminal determines the transmit beam of the first signal as the transmit beam of the to-be-transmitted PUCCH, or determines a transmit beam in a direction similar to that of the transmit beam of the first signal as the transmit beam of the to-be-transmitted PUCCH.

In some embodiments, when the first signal is a downlink signal, the terminal may determine the receive beam of the first signal as the transmit beam of the to-be-transmitted PUCCH, or determine a receive beam in a direction similar to that of the receive beam of the first signal as the transmit beam of the to-be-transmitted PUCCH.

In some embodiments, the terminal determines the transmit beam of the to-be-transmitted PUCCH according to a receive or transmit beam of a second signal transmitted on a resource indicated by the resource or signal indication information.

In some embodiments, the second signal transmitted on the resource indicated by the first resource or signal may be a signal sent before the PUCCH is sent.

In some embodiments, when the second signal is an uplink signal, the terminal determines a transmit beam of the second signal as the transmit beam of the to-be-transmitted PUCCH, or determines a transmit beam in a direction similar to that of a transmit beam of the second signal as the transmit beam of the to-be-transmitted PUCCH.

In some embodiments, when the second signal is a downlink signal, a receive beam of the second signal is determined as the transmit beam of the to-be-transmitted PUCCH, or a receive beam in a direction similar to that of a receive beam of the second signal is determined as the transmit beam of the to-be-transmitted PUCCH.

In 330, the terminal sends the to-be-transmitted PUCCH by using the determined transmit beam of the to-be-transmitted PUCCH.

Therefore, the terminal selects a transmit beam of a to-be-transmitted PUCCH according to resource or signal indication information, to select a more suitable transmit beam used for the to-be-transmitted PUCCH, to achieve a higher beamforming gain, thereby further improving communication performance.

The method 200 and the method 300 are simply described above respectively, and content described below is applicable to both the methods 200 and 300.

In some embodiments, the resource or signal indication information is sounding reference signal (Sounding Reference Signal, SRS) resource indication information, used to indicate one of at least one SRS resource.

Specifically, the terminal may send an SRS on the at least one SRS resource, and after receiving the SRS sent by the terminal, a network device may select one (for example, an SRS resource carrying an SRS with best signal quality) of the at least one SRS resource, and indicate the selected SRS resource to the terminal by using the SRS resource indication information.

In some embodiments, when the terminal sends SRSs on a plurality of SRS resources, transmit beams of different SRS resources may be different.

In some embodiments, compared with another SRS resource, each of the at least one SRS resource may have an independent configuration parameter, for example, have an independent SRS sending period, an independent SRS triggering manner, an independent transmit beam, or an independent quantity of times of SRS sending when sending of the SRS is triggered.

In some embodiments, the terminal determines, according to preset information, an SRS resource on which an SRS needs to be sent.

In some embodiments, the resource or signal indication information is channel state information-reference signal (Channel State Information Reference Signal, CSI-RS) resource indication information, used to indicate one of at least one CSI-RS resource.

Specifically, the network device may send a CSI-RS on the at least one CSI-RS resource. The terminal may receive a CSI-RS sent on each of the at least one CSI-RS resource, obtain channel state information (Channel State Information, CSI), and send the CSI to the network device. The network device may select one (for example, a CSI-RS resource with optimal channel quality) of the at least one CSI-RS resource according to the CSI corresponding to each CSI-RS resource, and indicate the CSI-RS resource to the terminal by using the CSI-RS resource indication information.

In some embodiments, when the terminal receives CSI-RSs on different CSI-RS resources, used receive beams may be different.

In some embodiments, compared with another CSI-RS resource, each of the at least one CSI-RS resource may have an independent configuration parameter, for example, have an independent CSI-RS sending period.

In some embodiments, the terminal may determine, according to preset information, a CSI-RS resource on which a CSI-RS needs to be received.

In some embodiments, the resource or signal indication information is synchronization signal block indication information, used to indicate one of at least one synchronization signal block.

In some embodiments, the network device may randomly select one of the at least one synchronization signal block, or select a synchronization signal block with better or optimal synchronization performance for the terminal, and indicate the synchronization signal block to the terminal by using the synchronization signal block indication information.

In some embodiments, the terminal may determine, according to preset information, a synchronization signal block available for selection and synchronization.

In some embodiments, the terminal determines a type of the resource or signal indication information depending on whether a beam correspondence is available; and determines the resource or signal indication information with the type.

In some embodiments, the type of the resource or signal indication information may be distinguished by using different types of indicated resources or signals. For example, three types, namely, CSI-RS resource indication information, SRS resource indication information, and synchronization signal block indication information are included.

In a manner, when the beam correspondence is available, the terminal determines that the type of the resource or signal indication information is CSI-RS resource indication information or synchronization signal block indication information. The CSI-RS resource indication information is used to indicate one of at least one CSI-RS resource. The synchronization signal block indication information is used to indicate one of at least one synchronization signal block.

In a manner, when the beam correspondence of the terminal is unavailable, it is determined that the type of the resource or signal indication information is SRS resource indication information. The SRS resource indication information is used to indicate one of at least one SRS resource.

That the terminal may determine the type of the resource or signal indication information depending on whether the beam correspondence of the terminal is available is described above.

In this embodiment of this application, the network device may alternatively indicate, depending on whether the beam correspondence of the terminal is available, a type of resource or signal indication information used by the terminal, to determine the uplink or downlink signal quasi co-located with the to-be-transmitted PUCCH, so that the terminal may obtain the resource or signal indication information by using the type of the resource or signal indication information that is indicated by the network device. The beam correspondence of the terminal that is used by the network device may be notified by the terminal to the network device.

Content related to the type of the resource or signal indication information is described above, and a manner of obtaining the resource or signal indication information by the terminal is described below. Resource or signal indication information obtained below may be any one type of resource or signal indication information mentioned above.

In Manner (1), the terminal obtains the resource or signal indication information from downlink control information DCI for scheduling a physical downlink shared channel PDSCH corresponding to the to-be-transmitted PUCCH.

In some embodiments, the to-be-transmitted PUCCH is used to carry an acknowledgement ACK command or a negative acknowledgement NACK command for downlink transmission, and the PDSCH carries the downlink transmission.

In some embodiments, the terminal determines, according to the resource or signal indication information, a power adjustment value corresponding to a transmit power control (Transmit Power Control, TPC) command carried in the DCI and used for the to-be-transmitted PUCCH.

Specifically, different values of the resource or signal indication information may correspond to different TPC mapping tables. The table is used to determine a correspondence between a TPC command and a power adjustment value. The power adjustment value may be an absolute value (namely, a power value needing to be adjusted to), or may be an accumulated value (namely, a value needing to be adjusted based on an original power value).

In some embodiments, the terminal determines, according to the resource or signal indication information, a closed-loop power control process to which the TPC command carried in the DCI and used for the to-be-transmitted PUCCH belongs.

Specifically, the resource or signal indication information can be used to determine the transmit beam of the to-be-transmitted PUCCH, and can be further used to determine a current closed-loop power control process. The terminal determines, according to the resource or signal indication information, a closed-loop power control process in which a power adjustment value corresponding to the TPC command is accumulated. A correspondence between a value of resource or signal indication information and a closed-loop power control process may be preset on the terminal or configured by the network device for the terminal.

In Manner (2), the terminal obtains the resource or signal indication information from recently received DCI used to schedule a physical uplink shared channel (Physical Uplink Shared Channel, PUSCH).

In this implementation, the to-be-transmitted PUCCH may be used to carry an ACK command or a NACK command for downlink transmission or used to carry CSI.

In Manner (3), the resource or signal indication information is obtained from DCI. The DCI includes only a TPC command used for a PUCCH and resource or signal indication information used for the PUCCH, and the DCI includes the TPC command used for the to-be-transmitted PUCCH and the resource or signal indication information used for the to-be-transmitted PUCCH.

In this implementation, the to-be-transmitted PUCCH may be used to carry an ACK command or a NACK command for downlink transmission or used to carry CSI.

Specifically, the resource or signal indication information of the to-be-transmitted PUCCH and the TPC command for the to-be-transmitted PUCCH may be indicated together.

For example, the first DCI includes N information fields, each information field includes a TPC command for one PUCCH and resource or signal indication information for the PUCCH. The terminal obtains, by using higher layer signaling, an index of an information field corresponding to the to-be-transmitted PUCCH in all the information fields of the DCI.

In Manner (4), the resource or signal indication information is obtained from higher layer signaling.

In this implementation, the to-be-transmitted PUCCH may be used to carry an ACK command or a NACK command for downlink transmission or used to carry CSI.

In Manner (5), the resource or signal indication information is determined according to a power control process used by the to-be-transmitted PUCCH.

In this implementation, the to-be-transmitted PUCCH may be used to carry an ACK command or a NACK command for downlink transmission or used to carry CSI.

Specifically, the network device configures a plurality of power control processes for the terminal, and indicates the power control process used by the to-be-transmitted PUCCH to the terminal. The terminal determines the resource or signal indication information according to the used process. A correspondence between a process and at least one piece of resource or signal indication information (namely, at least one information value) may be preset on the terminal or configured by the network device for the terminal.

In Manner (6), the terminal obtains the resource or signal indication information from a CSI reporting configuration corresponding to first CSI. The to-be-transmitted PUCCH is used to transmit the first CSI.

In this implementation, the to-be-transmitted PUCCH may be used to carry CSI.

It can be learned from the plurality of obtaining manners of the resource or signal indication information described above that, the resource or signal indication information is obtained by using information from the network device. Therefore, the network device may flexibly adjust a beam used by the terminal to transmit the PUCCH.

The plurality of obtaining manners of the resource or signal indication information are described above. A specific obtaining manner to be used may be determined according to a PUCCH format of the to-be-transmitted PUCCH, to determine the obtaining manner of the first resource or signal. The resource or signal indication information is obtained according to the determined obtaining manner.

For example, for a PUCCH format available for transmitting CSI, the resource or signal indication information may be obtained by using Manner (2), (3), (4), (5), or (6).

For example, for a PUCCH format available for transmitting a NACK command or an ACK command, the resource or signal indication information may be obtained by using Manner (1), (2), (3), (4), or (5).

In some embodiments, resource or signal obtaining manners used by PUCCHs using different PUCCH formats are different. Different obtaining manners may be used for a PUCCH format for sending a NACK command or an ACK command and a PUCCH format for sending CSI.

In some embodiments, for different PUCCH formats, the resource or signal indication information may be obtained in a same manner. For example, the resource or signal indication information is obtained by using higher layer signaling.

In this case, resource or signal indication information corresponding to different PUCCH formats may be indicated by using independent signaling or different information fields of same signaling.

Therefore, in this embodiment of this application, the terminal determines, according to the resource or signal indication information, how to send the to-be-transmitted PUCCH (for example, determines the transmit beam), so that the to-be-transmitted PUCCH can be sent more properly, thereby improving communication performance.

Figure 4:
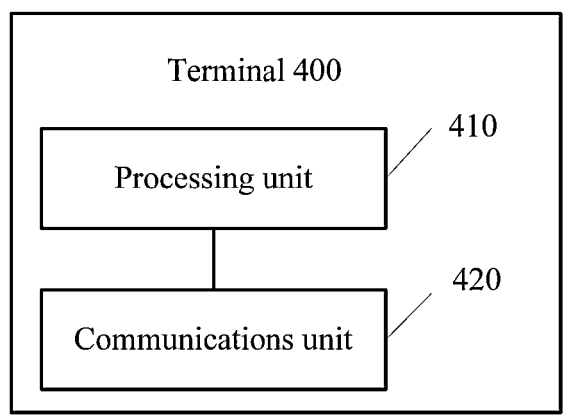
FIG. 4 is a schematic block diagram of a terminal according to an embodiment of this application.

FIG. 4 is a schematic block diagram of a terminal 400 according to an embodiment of this application. As shown in FIG. 4, the terminal 400 includes a processing unit 410 and a communications unit 420.

In some embodiments, the processing unit 410 is configured to: determine resource or signal indication information; and determine, according to the resource or signal indication information, an uplink or downlink signal quasi co-located with the to-be-transmitted PUCCH. The communications unit 420 is configured to send the to-be-transmitted PUCCH according to a quasi co-location relationship between the to-be-transmitted PUCCH and the uplink or downlink signal.

In some embodiments, the processing unit 410 is configured to: determine resource or signal indication information; and determine a transmit beam of the to-be-transmitted PUCCH according to the resource or signal indication information. The communications unit 420 is configured to send the to-be-transmitted PUCCH by using the determined transmit beam of the to-be-transmitted PUCCH.

It should be understood that, the terminal 400 may correspond to the terminal in the method embodiments, and can implement a corresponding operation implemented by the terminal in the method embodiments. For brevity, details are not described herein again.

Figure 5:
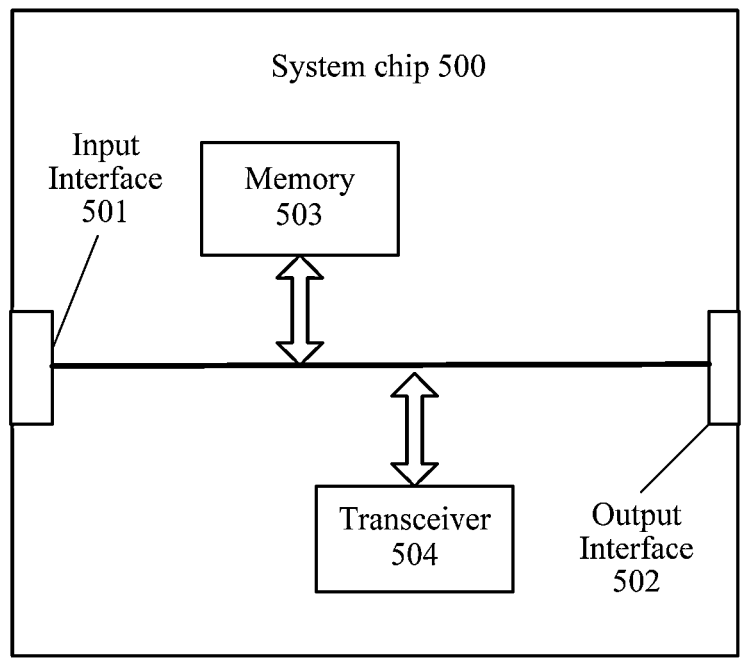
FIG. 5 is a schematic block diagram of a system chip according to an embodiment of this application.

FIG. 5 is a schematic structural diagram of a system chip 500 according to an embodiment of this application. The system chip 500 in FIG. 5 includes an input interface 501, an output interface 502, a processor 503, and a memory 504 that can be connected to each other by using an internal communication connection line. The processor 503 is configured to execute code in the memory 504.

In some embodiments, when the code is executed, the processor 503 implements the method performed by the terminal in the method embodiments. For brevity, details are not described herein again.

Figure 6:
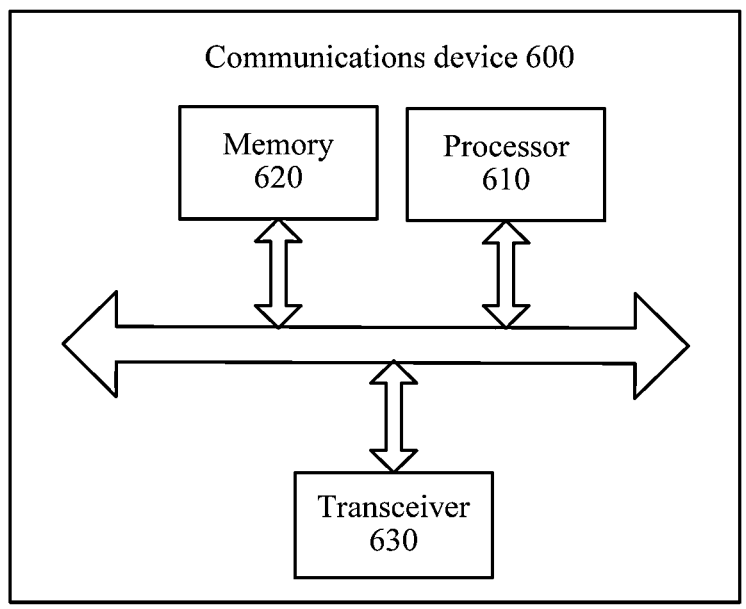
FIG. 6 is a schematic block diagram of a communications device according to an embodiment of this application.

FIG. 6 is a schematic block diagram of a communications device 600 according to an embodiment of this application. As shown in FIG. 6, the communications device 600 includes a processor 610 and a memory 620. The memory 620 may store program code. The processor 610 may execute the program code stored in the memory 620.

In some embodiments, as shown in FIG. 6, the communications device 600 may include a transceiver 630. The processor 610 may control the transceiver 630 to communicate with the outside.

The processor 610 may invoke the program code stored in the memory 620 to perform a corresponding operation of the terminal in the method embodiments. For brevity, details are not described herein again.

It should be understood that, the processor in this embodiment of this application may be an integrated circuit chip having a signal processing capability. In an implementation process, the steps in the foregoing method embodiments may be implemented by using a hardware integrated logic circuit in the processor, or by using instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor or the processor may be any conventional processor, or the like. Steps of the methods disclosed in the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory or an electrically erasable programmable memory, or a register. The storage medium is located in the memory, and the processor reads information in the memory and completes the steps in the foregoing methods in combination with hardware of the processor.

It may be understood that, the memory in this embodiment of this application may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DR RAM). It should be noted that the memory in the system and the method described in this specification aims to include but is not limited to these memories and any memory of another proper type.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, the apparatus, and the unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communications method, comprising:
obtaining, by a terminal device, resource or signal indication information, comprising: determining an obtaining manner of the resource or signal indication information according to a physical uplink control channel (PUCCH) format of a PUCCH, and obtaining the resource or signal indication information according to the determined obtaining manner;
determining, by the terminal device according to the resource or signal indication information, an uplink or downlink signal quasi co-located with the PUCCH, and determining, by the terminal device according to the resource or signal indication information, a power adjustment value corresponding to a transmit power control (TPC) command for the PUCCH carried in downlink control information (DCI) that is used for scheduling a PDSCH corresponding to the PUCCH, the power adjustment value being an accumulated value, wherein the resource or signal indication information is used for determining a transmit beam of the PUCCH and is further used for determining a current closed-loop power control process, including determining a closed-loop power control process in which the power adjustment value corresponding to the TPC command is accumulated; and
sending, by the terminal device, the PUCCH according to a quasi co-location relationship between the PUCCH and the uplink or downlink signal, comprising: when the signal quasi co-located with the PUCCH is an uplink signal, determining a transmit beam of the uplink signal as the transmit beam of the PUCCH, or when the signal quasi co-located with the PUCCH is a downlink signal, determining a receive beam of the downlink signal as the transmit beam of the PUCCH; and sending the PUCCH by using the determined transmit beam.

2. The method according to claim 1, wherein the resource or signal indication information comprises at least one of:
synchronization signal block, SSB, indication information, used to indicate one SSB of at least one SSB;
channel state information-reference signal, CSI-RS, resource indication information, used to indicate one resource of at least one CSI-RS resource; and
sounding reference signal, SRS, resource indication information, used to indicate one resource of at least one SRS resource.

3. The method according to claim 2, wherein the obtaining, by a terminal device, resource or signal indication information comprises:
determining a type of the resource or signal indication information based on an availability of a beam correspondence; and
receiving the resource or signal indication information with the determined type of the resource or signal information.

4. The method according to claim 3, wherein the determining a type of the resource or signal indication information based on an availability of a beam correspondence comprises:
when the beam correspondence is available, determining that the resource or signal indication information comprises the CSI-RS resource indication information or the SSB indication information.

5. The method according to claim 1, wherein the PUCCH being quasi co-located with the uplink or downlink signal comprises the PUCCH being quasi co-located with the uplink or downlink signal for a spatial reception parameter.

6. A terminal device, comprising a processor, a memory coupled to the processor and a plurality of programs stored in the memory that, when executed by the processor, cause the terminal device to perform a plurality of operations comprising:
obtaining resource or signal indication information, comprising: determining an obtaining manner of the resource or signal indication information according to a physical uplink control channel (PUCCH) format of a PUCCH, and obtaining the resource or signal indication information according to the determined obtaining manner;
determining, according to the resource or signal indication information, an uplink or downlink signal quasi co-located with the PUCCH, and determining, according to the resource or signal indication information, a power adjustment value corresponding to a transmit power control (TPC) command for the PUCCH carried in downlink control information (DCI) that is used for scheduling a PDSCH corresponding to the PUCCH, the power adjustment value being an accumulated value, wherein the resource or signal indication information is used for determining a transmit beam of the PUCCH and is further used for determining a current closed-loop power control process, including determining a closed-loop power control process in which the power adjustment value corresponding to the TPC command is accumulated, and
sending the PUCCH according to a quasi co-location relationship between the PUCCH and the uplink or downlink signal, comprising: when the signal quasi co-located with the PUCCH is an uplink signal, determining a transmit beam of the uplink signal as the transmit beam of the PUCCH, or when the signal quasi co-located with the PUCCH is a downlink signal, determining a receive beam of the downlink signal as the transmit beam of the PUCCH; and sending the PUCCH by using the determined transmit beam.

7. The terminal device according to claim 6, wherein the resource or signal indication information comprises at least one of:
synchronization signal block, SSB, indication information, used to indicate one SSB of at least one SSB;
channel state information-reference signal, CSI-RS, resource indication information, used to indicate one resource of at least one CSI-RS resource; and
sounding reference signal, SRS, resource indication information, used to indicate one resource of at least one SRS resource.

8. The terminal device according to claim 7, wherein the processor is further configured to: determine a type of the resource or signal indication information based on an availability of a beam correspondence; and receive the resource or signal indication information with the determined type of the resource or signal information.

9. The terminal device according to claim 8, wherein the processor is further configured to:
when the beam correspondence is available, determine that the resource or signal indication information comprises the CSI-RS resource indication information or the SSB indication information.

10. The terminal device according to claim 6, wherein the PUCCH being quasi co-located with the uplink or downlink signal comprises the PUCCH being quasi co-located with the uplink or downlink signal for a spatial reception parameter.

11. A non-transitory computer storage medium for storing a computer program that causes a computer to perform following operations:
obtaining resource or signal indication information, comprising: determining an obtaining manner of the resource or signal indication information according to a physical uplink control channel (PUCCH) format of a PUCCH, and obtaining the resource or signal indication information according to the determined obtaining manner;
determining, according to the resource or signal indication information, an uplink or downlink signal quasi co-located with the PUCCH, and determining, according to the resource or signal indication information, a power adjustment value corresponding to a transmit power control (TPC) command for the PUCCH carried in downlink control information (DCI) that is used for scheduling a PDSCH corresponding to the PUCCH, the power adjustment value being an accumulated value, wherein the resource or signal indication information is used for determining a transmit beam of the PUCCH and is further used for determining a current closed-loop power control process, including determining a closed-loop power control process in which the power adjustment value corresponding to the TPC command is accumulated, and
sending the PUCCH according to a quasi co-location relationship between the PUCCH and the uplink or downlink signal, comprising: when the signal quasi co-located with the PUCCH is an uplink signal, determining a transmit beam of the uplink signal as the transmit beam of the PUCCH, or when the signal quasi co-located with the PUCCH is a downlink signal, determining a receive beam of the downlink signal as the transmit beam of the PUCCH; and sending the PUCCH by using the determined transmit beam.

12. The computer storage medium according to claim 11, wherein the resource or signal indication information comprises at least one of:
   synchronization signal block, SSB, indication information, used to indicate one SSB of at least one SSB;
   channel state information-reference signal, CSI-RS, resource indication information, used to indicate one resource of at least one CSI-RS resource; and
   sounding reference signal, SRS, resource indication information, used to indicate one resource of at least one SRS resource.

13. The computer storage medium according to claim 12, wherein the obtaining resource or signal indication information comprises:
   determining a type of the resource or signal indication information based on an availability of a beam correspondence; and
   receiving the resource or signal indication information with the determined type of the resource or signal information.

14. The computer storage medium according to claim 13, wherein the determining a type of the resource or signal indication information based on an availability of a beam correspondence comprises:
   when the beam correspondence is available, determining that the resource or signal indication information comprises the CSI-RS resource or signal indication information or the SSB indication information.

15. The computer storage medium according to claim 11, wherein the PUCCH being quasi co-located with the uplink or downlink signal comprises the PUCCH being quasi co-located with the uplink or downlink signal for a spatial reception parameter.

* * * * *